July 6, 1937. A. TIMMERBEIL 2,086,449
METHOD OF ASSEMBLING HOOKS AND SPACING STRIPS FOR BELT FASTENERS
Filed Nov. 14, 1934
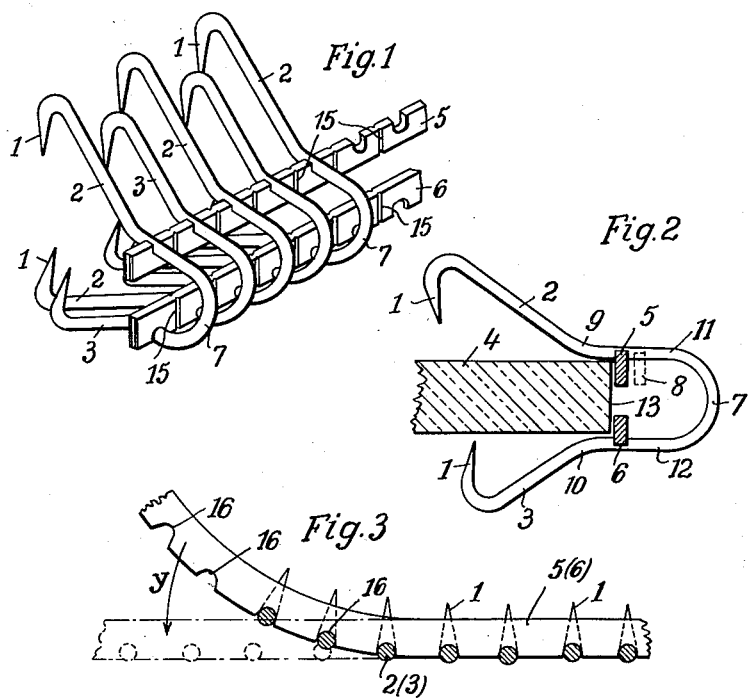
Inventor:
Alfred Timmerbeil
By Franks. Appleman, Atty.

Patented July 6, 1937

2,086,449

UNITED STATES PATENT OFFICE 2,086,449

METHOD OF ASSEMBLING HOOKS AND SPACING STRIPS FOR BELT FASTENERS

Alfred Timmerbeil, Arnhem, Netherlands

Application November 14, 1934, Serial No. 753,028
In the Netherlands December 15, 1933

2 Claims. (Cl. 140—84)

This invention relates to a device for joining together the ends of belts or straps, which comprises two sets of spaced wire hooks, the hooks in each set being connected together by transverse members, and the two sets of hooks being adapted, after having been pressed into the two ends of the belt or strap, to embrace and be coupled together by a joint pin or connecting member passed through their interengaging vertices.

It is an object of the present invention to enable the hooks to be secured to said transverse members in a simple and reliable way without the employment of soldering or welding. The invention offers the advantages that the useful life of the connecting or joining device is considerably lengthened and that a smooth and level joint is produced, which prevents damage to the belt pulleys.

This object is attained, according to the invention in that the wire hooks are placed into almost circular recesses so that a portion of the circumference of the hook limb projects beyond the sharp edges of the transverse strips. The hooks are secured in the transverse strip, by straightening the transverse strip from its curved state in which the recesses for the wire hooks are in the edge of the strap on the outer side of the arc.

The increase of the useful life of the belt connecting device thus obtained is further improved by suitably arranging the transverse strips or members in such way as to prevent their being forced into the belt and thereby weakening the latter. For this purpose the transverse strips may be so arranged as to form an abutment which prevents the belt entering the vertex portion of the hooks which embraces the jointing pin or member. The transverse strips may be arranged with their side surfaces parallel to one another. Apart from providing a reliable abutment for the end of the belt, this arrangement has the further advantage that the transverse strips, when provided with incisions or notches running perpendicularly to the longitudinal axis of the strip, may be broken off by hand to the desired length without employing a tool.

In order that the invention may be clearly understood and readily carried into practice it is illustrated by way of example in the accompanying drawing in which:—

Fig. 1 is a perspective view of the belt or strap connecting device.

Fig. 2 is a transverse section thereof.

Fig. 3 shows one way of securing the hooks into the transverse strips or members.

In Fig. 1 for the sake of simplicity only one portion of a strap or belt fastener is illustrated. Each portion of the fastener consists of a plurality of somewhat V or U-shaped wire hooks, the limbs 2, 3 of which are of unequal length and have inwardly turned points 1, for engaging into the end of a belt or strap 4. The individual hooks 2, 3 are connected together and spaced apart by transverse strips, bars or like members 5, 6 which are situated on the inside of the limbs 2, 3 of the hooks and adjacent the apices 7 of the hooks. The cross strips 5, 6 are provided at one longitudinal edge with recesses or notches for receiving the limbs 2, 3 of the hooks. The manner in which the latter are secured in their recesses will be more fully described hereunder.

The cross members 5, 6 are each of rectangular cross-section, and as shown in Fig. 2, are so arranged that their side surfaces are parallel to one another. Preferably the two strips 5, 6 lie in the same plane. As indicated however in broken lines in Figure 2, one cross-member 8, may be displaced parallel to the cross member 6. The parallel arrangement of these cross members can be effected for example by the limbs 2, 3 of the hooks being bent at opposite points 9 and 10 respectively so that the portions 11, 12 directly adjacent at the apex 7 of the hook run substantially parallel to one another, the cross members 5, 6 standing perpendicularly to these portions 11, 12.

The inwardly projecting members 5, 6 form abutments for the end face 13 of the belt or strap 4, and in this way the end of the belt or strap is prevented from entering into the eye formed by the apex 7 and the adjacent parts 11, 12 of the hooks, which in the known way serve to receive the jointing pin (not shown).

Between the notches for receiving the limbs 2, 3 of the hooks the cross members have grooves or incisions 15. In combination with the parallel arrangement of the cross-members 5, 6 the provision of the grooves or incisions 15 has the advantage that the connecting device can be given any required length by simply breaking the cross-members, without any special tools such as shears or the like being necessary for this purpose.

The individual hooks are advantageously secured in the cross members in the following way. In the method illustrated in Figure 3, each of the cross members 5 or 6, previously provided with the recesses 16, is bent to arcuate shape, the recesses 16 for receiving the limbs of the hooks being located on the outside of the arc. The limbs 2, 3 while the bodies of the hooks are straight are then inserted into the recesses 16 of the curved strip, and then when the latter is bent straight (in the direction of the arrow Y) the cross-section of the recesses is reduced and the limbs 2, 3 of the hooks are clamped in position. The hooks are then bent as at 7 in Fig. 1.

I claim:—

1. The method of assembling wire belt hooks and spacing strips therefor which consists in providing an arcuately curved spacing strip of bendable metal having notches in its outer edge conforming in width to the diameter of the wire used in the hooks, fitting the hooks in said notches, and straightening the strip whereby the notches are contracted and their sides grip the wires of the hooks.

2. The method of assembling wire belt hooks and spacing strips therefor which consists in providing an arcuately curved spacing strip of bendable metal having notches in its outer edge conforming in width to the diameter of the wire used in the hooks, said notches being of less depth than the diameter of said wire, fitting the hooks in said notches and straightening the strip whereby the notches are contracted and their sides grip the wires of the hooks.

ALFRED TIMMERBEIL.